United States Patent
Robles et al.

(10) Patent No.: US 8,402,397 B2
(45) Date of Patent: Mar. 19, 2013

(54) HOTSPOT DETECTION BASED ON MACHINE LEARNING

(75) Inventors: Juan Andres Torres Robles, Wilsonville, OR (US); Salma Mostafa Fahmy, Cairo (EG); Kareem Madkour, Cairo (EG); Jen-Yi Wuu, Sunnyvale, CA (US)

(73) Assignee: Mentor Graphics Corporation, Wilsonville, OR (US)

(*) Notice: Subject to any disclaimer, the term of this patent is extended or adjusted under 35 U.S.C. 154(b) by 0 days.

(21) Appl. No.: 13/191,433

(22) Filed: Jul. 26, 2011

(65) Prior Publication Data

US 2013/0031522 A1      Jan. 31, 2013

(51) Int. Cl.
*G06F 17/50* (2006.01)
(52) U.S. Cl. ........... 716/52; 716/51; 716/53; 716/54; 716/55; 716/56; 430/5; 430/30
(58) Field of Classification Search .......... 716/50–56, 716/111, 112; 430/5, 30
See application file for complete search history.

(56) References Cited

U.S. PATENT DOCUMENTS

| | | | |
|---|---|---|---|
| 6,728,404 B1* | 4/2004 | Ono et al. ............ 382/190 |
| 7,371,590 B2* | 5/2008 | Capaldo et al. ......... 438/14 |
| 7,444,616 B2* | 10/2008 | Sandstrom et al. ...... 716/53 |
| 7,512,927 B2* | 3/2009 | Gallatin et al. ......... 716/51 |
| 7,739,651 B2* | 6/2010 | Melvin et al. ........... 716/50 |
| 7,904,853 B1* | 3/2011 | Lei et al. ............... 716/136 |
| 8,001,512 B1* | 8/2011 | White .................... 716/119 |
| 2006/0074828 A1* | 4/2006 | Heumann et al. ...... 706/20 |
| 2007/0117225 A1* | 5/2007 | Capaldo et al. ........ 438/14 |
| 2008/0077907 A1* | 3/2008 | Kulkarni ............... 716/20 |
| 2009/0031271 A1* | 1/2009 | White et al. ............ 716/10 |
| 2009/0138835 A1* | 5/2009 | Sinha et al. ............. 716/4 |
| 2009/0199137 A1* | 8/2009 | Huckabay et al. ...... 716/4 |
| 2009/0231424 A1* | 9/2009 | Honda et al. ........... 348/87 |
| 2010/0083200 A1* | 4/2010 | Song et al. .............. 716/5 |
| 2011/0078206 A1* | 3/2011 | Chen et al. ............. 707/797 |
| 2012/0030643 A1* | 2/2012 | Hurley et al. ........... 716/136 |

OTHER PUBLICATIONS

Nagase N., et. al. "Study of hotspot detection using neural network judgement", Proc. SPIE 6607 (2007).

Duo Ding, Andres J. Torres, Fedor G. Pikus and David Z. Pan, "High Performance Lithographic Hotspot Detection using Hierarchically Refined Machine Learning," IEEE Int. Workshop on Design for Manufacturability and Yield, 2010.

D. Ding, X. Wu, J. Ghosh, and D. Z. Pan, "Machine Learning Based Lithographic Hotspot Detection with Critical-Feature Extraction and Classification," Proc. Int. Conf. for Integrated Circuit Design Technology, pp. 219-222, 2009.

Salma Mostafa1, J. Andres Torres2, Peter Rezk1, Kareem Madkour, "Multi-selection method for physical design verification applications," Proceedings of SPIE, vol. 7974, 797407, 2011.

Jen-Yi Wuu, Fedor G. Pikus, and Malgorzata Marek-Sadowska. "Metrics for Characterizing Machine Learning-Based Hotspot Detection Methods," Proceedings of IEEE International Symposium on Quality Electronics Design (ISQED), 2011.

(Continued)

*Primary Examiner* — Nha Nguyen

(57) ABSTRACT

Aspects of the invention relate to machine-learning-based hotspot detection techniques. These hotspot detection techniques employ machine learning models constructed using two feature encoding schemes. When two-level machine learning methods are also employed, a total four machine learning models are constructed: scheme-one level-one, scheme-one level-two, scheme-two level-one and scheme-two level-two. The four models are applied to test patterns to derive scheme-one hotspot information and scheme-two hotspot information, which are then used to determine final hotspot information.

14 Claims, 6 Drawing Sheets

OTHER PUBLICATIONS

Jen-Yi Wuu, Fedor G. Pikus, and Malgorzata Marek-Sadowska. "Efficient Approach to Early Detection of Lithographic Hotspots Using Machine Learning Systems and Pattern Matching," Proceedings of SPIE, vol. 7974, 797429, 2011.

Jen-Yi Wuu, Fedor G. Pikus, Andres Torres, and Malgorzata Marek-Sadowska. "Using Machine Learning Systems for Early Lithographic Hotspot Detection," DesignCon, 2011.

Jen-Yi Wuu, Fedor G. Pikus, Andres Torres, and Malgorzata Marek-Sadowska. "Rapid Layout Pattern Classification," Proceedings of IEEE Asia and South Pacific Design Automation Conference (ASPDAC), 2011.

Jen-Yi Wuu, Fedor G. Pikus, Andres Torres, and Malgorzata Marek-Sadowska. "Rapid Two-Level Layout Pattern Classification for Hotspot Prediction," IEEE International Workshop on Design for Manufacturability and Yield (DFM&Y), 2010.

* cited by examiner

HOTSPOT DETECTION BASED ON MACHINE LEARNING

FIELD OF THE INVENTION

The present invention is directed to integrated circuit (IC) physical design verification. Various aspects of the invention may be particularly useful for detecting hotspots in a layout design.

BACKGROUND OF THE INVENTION

Overview

For the past few years, modern IC industry has been steadily following Moore's Law. As the shrinking of device feature sizes brings advantages such as reduction of circuit switching power and manufacturing cost, it is also accompanied by the problem of prolonged manufacturability closure. Printing sub-wavelength features results in serious resolution degradation, which affects a product's yield and reliability. Locations in a design where layout geometries will be printed with dimensions over or below specified threshold values are often referred to as lithographic hotspots or hotspots. Two common categories of the hotspots are pinching and bridging.

Traditionally, appropriate rules are checked at various design stages (e.g., design rule checking, or "DRC") to improve layout printability. DRC attempts to prevent printing imperfections by imposing geometric constraints on a layout design. In their original form, geometrical rules are one-dimensional and their capability of describing two-dimensional patterns is limited. As the rules are expanded to cover more complicated two-dimensional patterns, they either become overly conservative, or too relaxed to catch some hotspot patterns.

Resolution enhancement techniques (RET) such as the addition of sub-resolution assist features (SRAF) and optical proximity correction (OPC) can further improve layout printability. However, these techniques cannot completely resolve some printability problems. Accordingly, a model-based lithography simulation (or process simulation) is performed on the full design to capture a few undetected hotspots before tape-out. The model-based lithography simulation has been the golden standard for physical verification methods. However, this great accuracy comes at a price of high computational complexity and runtime. Thus, chip-scale lithography simulations are usually reserved for final safeguarding steps before tape-out.

Since the majority of hotspots can be eliminated through layout modifications, lithographic hotspot detection are typically embedded into the early design phases where the cost of layout tuning is cheaper. Pattern matching-based hotspot detection tools have been accepted in the industry. They are capable of efficiently scanning design layouts for undesirable patterns learned from previous experience. A major drawback of these tools, however, is their inability to detect bad patterns that will cause printability problems but that are absent from the database of undesirable patterns. With fuzzy matching algorithms, detection coverage can be improved. However, such approaches are still largely ineffective in detecting previously unseen hotspot patterns.

Recently, supervised machine learning techniques, such as those based on artificial neural networks and on support vector machines, have been applied to the field of hotspot detection. A supervised machine learning technique builds a classification or regression model using a set of training pattern samples with given class labels. The model is then used to predict the class labels of test samples. These machine learning techniques are capable of identifying hotspot test patterns unknown to the trained model. However, challenges remain in improving their detection accuracy and efficiency.

One of the challenges is aliasing, i.e., where two distinct patterns becoming indistinguishable with respect to a machine learning technique. Aliasing can be caused by layout pattern truncation during sampling. For example, if a feature encoding algorithm analyzes an area of a specified size clipped from a larger layout area as its input, two input samples that are geometrically identical within the clipped area but are different outside of the clipped area become indistinguishable. If the layout geometries outside of the clipped area have a non-negligible influence on the printability of the shapes inside the clipped area, such information is lost. This effect is graphically illustrated in FIG. 3a. It should be noted that layout pattern truncation is not restricted to clip-based feature encoding algorithms, however.

In addition to the size of sampling, aliasing may also be caused by the position of sampling. FIG. 3b illustrates an example of aliasing caused by the position of sampling. In this example, a density-based feature encoding method is used. Feature 310 is the original layout pattern. Feature 320 represents the rasterization of the pattern under a perfect alignment while feature 330 represents the rasterization of the pattern under an alignment that is shifted from the perfect alignment by one half pixel in both the horizontal and vertical positions. Different feature vectors are generated for feature 320 and feature 330, even though the same pattern is encoded. The different feature vectors may lead to different classification of the original layout pattern 310.

BRIEF SUMMARY OF THE INVENTION

Aspects of the invention relate to machine-learning-based hotspot detection techniques. These hotspot detection techniques employ machine learning models constructed using two feature encoding schemes. In various embodiments of the invention that employ density-based feature encoding methods, context windows for the two feature encoding schemes are placed in different positions in each of training patterns. With some implementations of the invention, the context windows may differ in their horizontal positions by a half of a horizontal dimension of a sliding window and in their vertical locations by a half of a vertical dimension of the sliding window.

The machine learning models may employ two-level machine learning techniques. For each encoding scheme, a level-one machine learning model may be used to classify the layout patterns into potential non-hotspots and potential hotspots, and a level-two machine learning model may be used to further refine the classification of the potential hotspots into false positives and hotspots. The two different level machine learning models are constructed by using different sizes of context windows and additionally or alternatively by using different sets of training patterns.

Final hotspot information is determined based on scheme-one hotspot information derived based on the scheme-one machine learning models and scheme-two hotspot information derived based on the scheme-two machine learning models. In some embodiments of the invention, layout patterns are identified as hotspots by either the scheme-one machine learning models or the scheme-two machine learning models are labeled as hotspots.

DETAILED DESCRIPTION OF THE INVENTION

Figure 1:
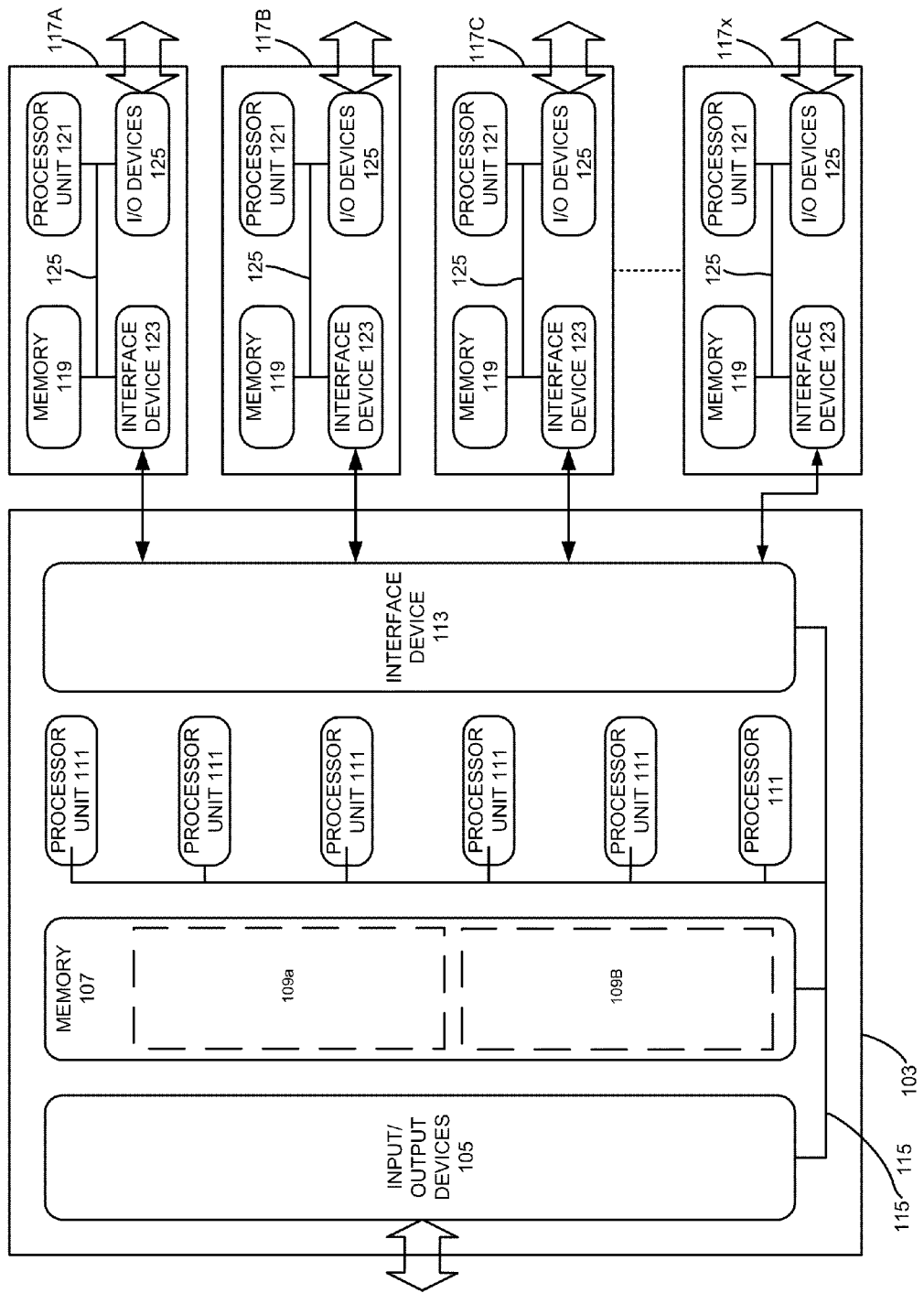
FIG. 1 illustrates a programmable computer system with which various embodiments of the invention may be employed.

Various aspects of the present invention relate to hotspot detection techniques. In the following description, numerous details are set forth for purpose of explanation. However, one of ordinary skill in the art will realize that the invention may be practiced without the use of these specific details. In other instances, well-known features have not been described in details to avoid obscuring the present invention.

Although the operations of some of the disclosed methods, apparatus, and systems are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods, apparatus, and systems can be used in conjunction with other methods, apparatus, and systems. Additionally, the description sometimes uses terms like "determine," "identify," "classify," "build" and "construct" to describe the disclosed methods. These terms are high-level abstractions of the actual operations that are performed. The actual operations that correspond to these terms may vary depending on the particular implementation and are readily discernible by one of ordinary skill in the art.

Any of the disclosed techniques can be implemented in whole or in part by software comprising computer-executable instructions stored on computer-readable media. Such software can comprise, for example, an appropriate electronic design automation ("EDA") software tool (e.g., an automatic test pattern generation ("ATPG") tool). Such software can be executed on a single computer or on a networked computer (e.g., via the Internet, a wide-area network, a local-area network, a client-server network, or other such network). For clarity, only certain selected aspects of the software-based implementations are described. Other details that are well known in the art are omitted. For example, it should be understood that the disclosed technology is not limited to any specific computer language, program, or computer. For example, the disclosed technology can be implemented using any commercially available computer executing a program written in any commercially available or otherwise suitable language. Any of the disclosed methods can alternatively be implemented (partially or completely) in hardware (e.g., an ASIC, PLD, or SoC).

Any data produced from any of the disclosed methods (e.g., intermediate or final test patterns, test patterns values, or control data) can be stored on computer-readable media (e.g., tangible computer-readable media, such as one or more CDs, volatile memory components (such as DRAM or SRAM), or nonvolatile memory components (such as hard drives)) using a variety of different data structures or formats. Such data can be created, updated, or stored using a local computer or over a network (e.g., by a server computer).

As used in this disclosure, the singular forms "a," "an," and "the" include the plural forms unless the context clearly dictates otherwise. Additionally, the term "includes" means "comprises." Moreover, unless the context dictates otherwise, the term "coupled" means electrically or electromagnetically connected or linked and includes both direct connections or direct links and indirect connections or indirect links through one or more intermediate elements not affecting the intended operation of the circuit. Furthermore, the term "design" is intended to encompass data describing an entire microdevice, such as an integrated circuit device or micro-electromechanical system (MEMS) device. This term also is intended to encompass a smaller group of data describing one or more components of an entire microdevice, however, such as a layer of an integrated circuit device, or even a portion of a layer of an integrated circuit device. Still further, the term "design" also is intended to encompass data describing more than one microdevice, such as data to be used to create a mask or reticle for simultaneously forming multiple microdevices on a single wafer. The layout design data may be in any desired format, such as, for example, the Graphic Data System II (GDSII) data format or the Open Artwork System Interchange Standard (OASIS) data format proposed by Semiconductor Equipment and Materials International (SEMI). Other formats include an open source format named Open Access, Milkyway by Synopsys, Inc., and EDDM by Mentor Graphics, Inc.

Exemplary Operating Environment

The execution of various electronic design automation processes may be implemented using computer-executable software instructions executed by one or more programmable computing devices. Because these examples of the invention may be implemented using software instructions, the components and operation of a generic programmable computer system on which various embodiments of the invention may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or slave computers therefore will be described with reference to FIG. 1. This operating environment is only one example of a suitable operating environment, however, and is not intended to suggest any limitation as to the scope of use or functionality of the invention.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
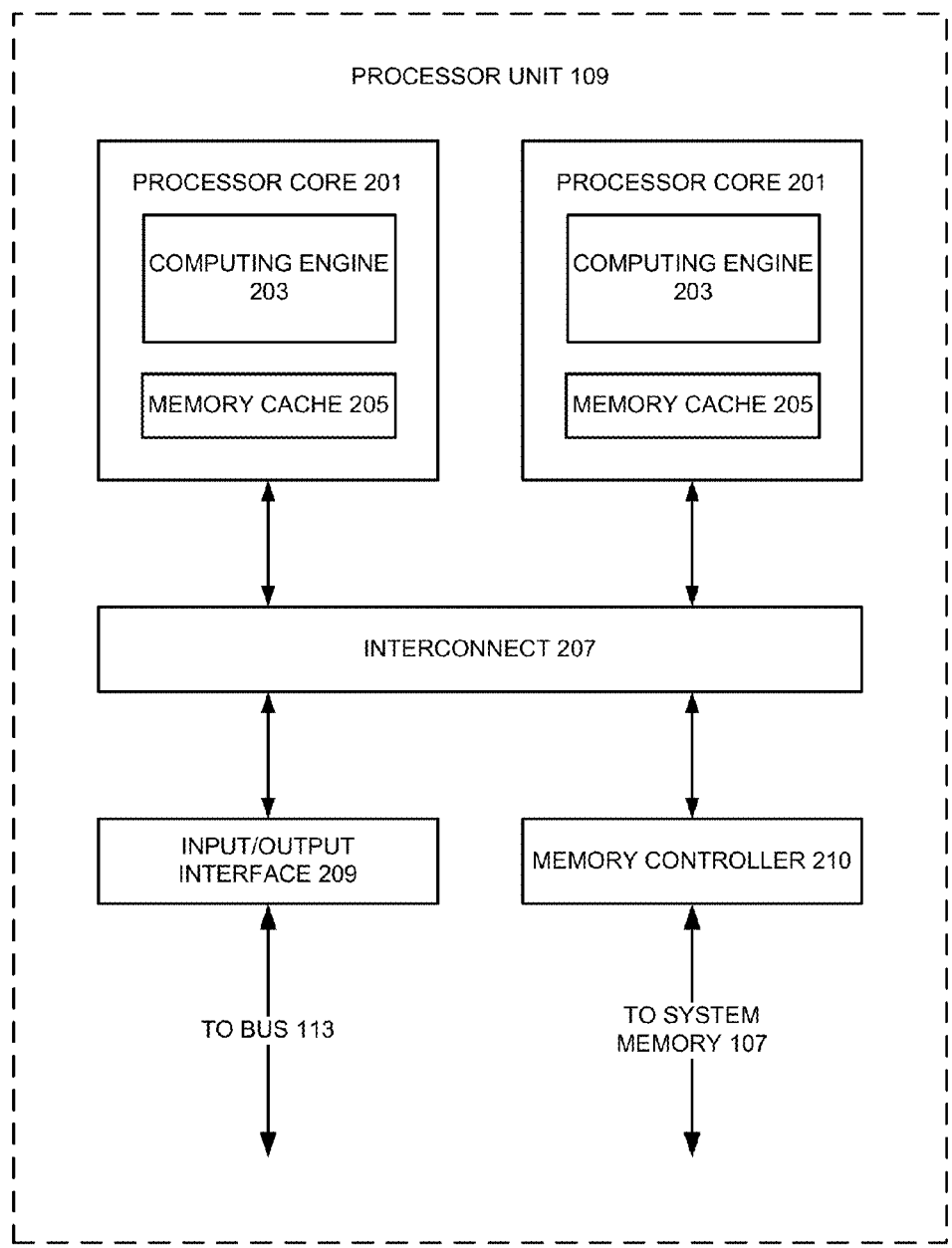
FIG. 2 illustrates a process for scan chain diagnosis in accordance with an embodiment of the present invention.

With some implementations of the invention, the master computing device 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interfaces 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. For example, some embodiments of the invention may employ a master computer 103 with one or more Cell processors. The Cell processor employs multiple input/output interfaces 209 and multiple memory controllers 211. Also, the Cell processor has nine different processor cores 201 of different types. More particularly, it has six or more synergistic processor elements (SPEs) and a power processor element (PPE). Each synergistic processor element has a vector-type computing engine 203 with 128×128 bit registers, four single-precision floating point computational units, four integer computational units, and a 256 KB local store memory that stores both instructions and data. The power processor element then controls that tasks performed by the synergistic processor elements. Because of its configuration, the Cell processor can perform some mathematical operations, such as the calculation of fast Fourier transforms (FFTs), at substantially higher speeds than many conventional processors.

It also should be appreciated that, with some implementations, a multi-core processor unit 111 can be used in lieu of multiple, separate processor units 111. For example, rather than employing six separate processor units 111, an alternate implementation of the invention may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the slave computers 117A, 115 7, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the slave computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each slave computer 117 may include a memory 119, a processor unit 121, an interface device 122, and, optionally, one more input/output devices 125 connected together by a system bus 127. As with the master computer 103, the optional input/output devices 125 for the slave computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the invention, one or more of the processor units 121 may be a Cell processor. The memory 119 then may be implemented using any combination of the computer readable media discussed above. Like the interface device 113, the interface devices 123 allow the slave computers 117 to communicate with the master computer 103 over the communication interface.

In the illustrated example, the master computer 103 is a multi-processor unit computer with multiple processor units 111, while each slave computer 117 has a single processor unit 121. It should be noted, however, that alternate implementations of the invention may employ a master computer having single processor unit 111. Further, one or more of the slave computers 117 may have multiple processor units 121, depending upon their intended use, as previously discussed. Also, while only a single interface device 113 or 123 is illustrated for both the master computer 103 and the slave computers, it should be noted that, with alternate embodiments of the invention, either the computer 103, one or more of the slave computers 117, or some combination of both may use two or more different interface devices 113 or 123 for communicating over multiple communication interfaces.

With various examples of the invention, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the invention, one or more of the slave computers 117 may alternately or additions be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the invention.

Supervised Machine Learning

In general, supervised machine learning methods seek to derive a function $f: X \to Y$, where $X \in R^n$ and $Y \in R$, where X is a set of given samples, or training set. The derived function $f$, often referred to as machine learning classifier, maps from the features of input samples (X) to a class label (Y) (i.e. predicting the class label of test samples). The lithographic hotspot pattern prediction problem is usually formulated as a two-class classification problem. The class label of any sample may assume one of the two possible values, e.g. 1 and −1, which represent hotspots and non-hotspots, respectively. The process of constructing machine learning classifiers from the training set is referred to as training (or model calibration/creation), while the process of class label prediction of test samples is referred to as testing (or hotspot detection in this application).

As noted earlier, supervised machine learning methods include the artificial neural network methods and the support vector machine (SVM) methods. The support vector machine methods map the training data into a higher dimensional space where the different classes can be separated by a hyper plane. This hyper plane is specified by a subset of its training samples called support vectors. An SVM separation hyper plane is derived by maximizing its margin from the training data points of different classes, which generally lowers the generalization error of the resulting classifier.

For example, given a set of training data points, $T=\{x_i,y_i\}$, where $x_i \in R^n$ and $y_i \in \{1,-1\}$ for $i=1, \ldots, k$, the binary C-SVM classification method solves the following optimization problem:

$$\min_{w,b,\xi}\left(\frac{1}{2}w^T w + C\sum_{i=1}^{k}\xi_i\right) \quad (1)$$

$$s.t.\ y_i(w^T\phi(x_i)+b) \geq 1-\xi_i, \xi_i \geq 0, i=1,\ldots,k$$

The solution of the optimization problem defines a hyperplane $w \cdot x + b = 0$ separating the classes. Minimizing the first term, $\frac{1}{2}w^T w$, corresponds to maximizing the margin between the two classes. The second term, $C\sum_{i=1}^{k}\xi_i$, introduces soft margins that account for mislabeled data points that may cause the hyperplane to not be able to perfectly separate the classes. This formulation results in hyperplanes that separate the two classes as cleanly as possible. In addition, the kernel function $K(x_i,x_j)=\phi(x_i)^T\phi(x_j)$ is used as a similarity metric between two input vectors $x_i$ and $x_j$. With various implementations of the invention, the radial basis function, $K(x_i,x_j)=\exp(-\gamma\|x_i-x_j\|^2)$, where $\gamma>0$, is used.

Two-Scheme Machine Learning Classification

Figure 3A:
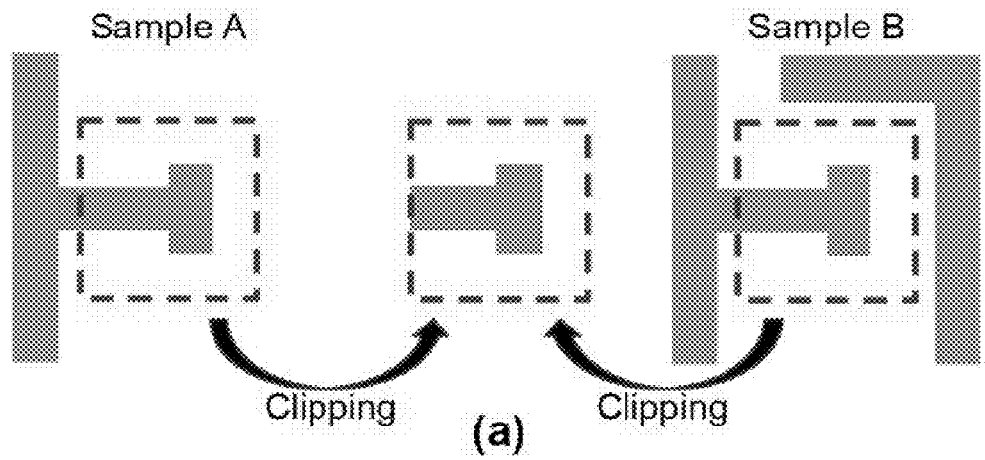
FIG. 3a illustrates an example of aliasing caused by a limited sampling size.
Figure 3B:
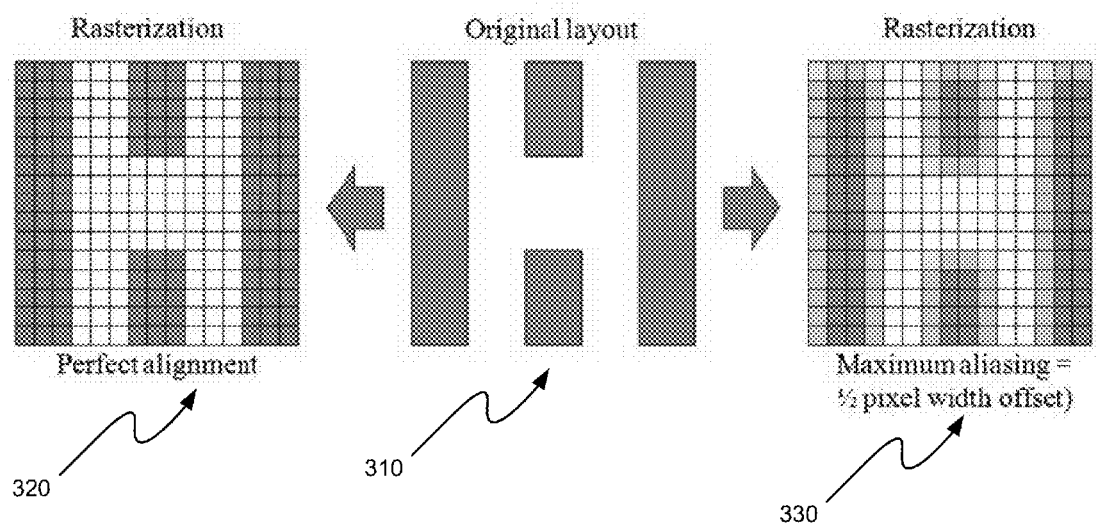
FIG. 3b illustrates an example of aliasing caused by different sampling positions.

Prior to classifying them using machine learning classifiers (or models), patterns need to be extracted from a layout design under test and to be characterized. This process is also referred to as feature encoding. As discussed previously, feature encoding may cause aliasing. FIG. 3a illustrates an example of aliasing in which two different patterns become indistinguishable due to the limited sampling size. FIG. 3b illustrates another example of aliasing in which a pattern may be misclassified due to the shifted sampling position.

Two-scheme machine learning classification methods may be employed to solve the aliasing problem associated with sampling positions. According to some embodiments of the invention, in a two-scheme machine learning classification flow, layout patterns are classified twice, each with one or more machine learning models obtained with a distinct feature encoding scheme defining how patterns are extracted and characterized. The two feature encoding schemes used in the two-scheme machine learning classification flow may differ, for example, in extracting (or sampling) positions.

Figure 4:
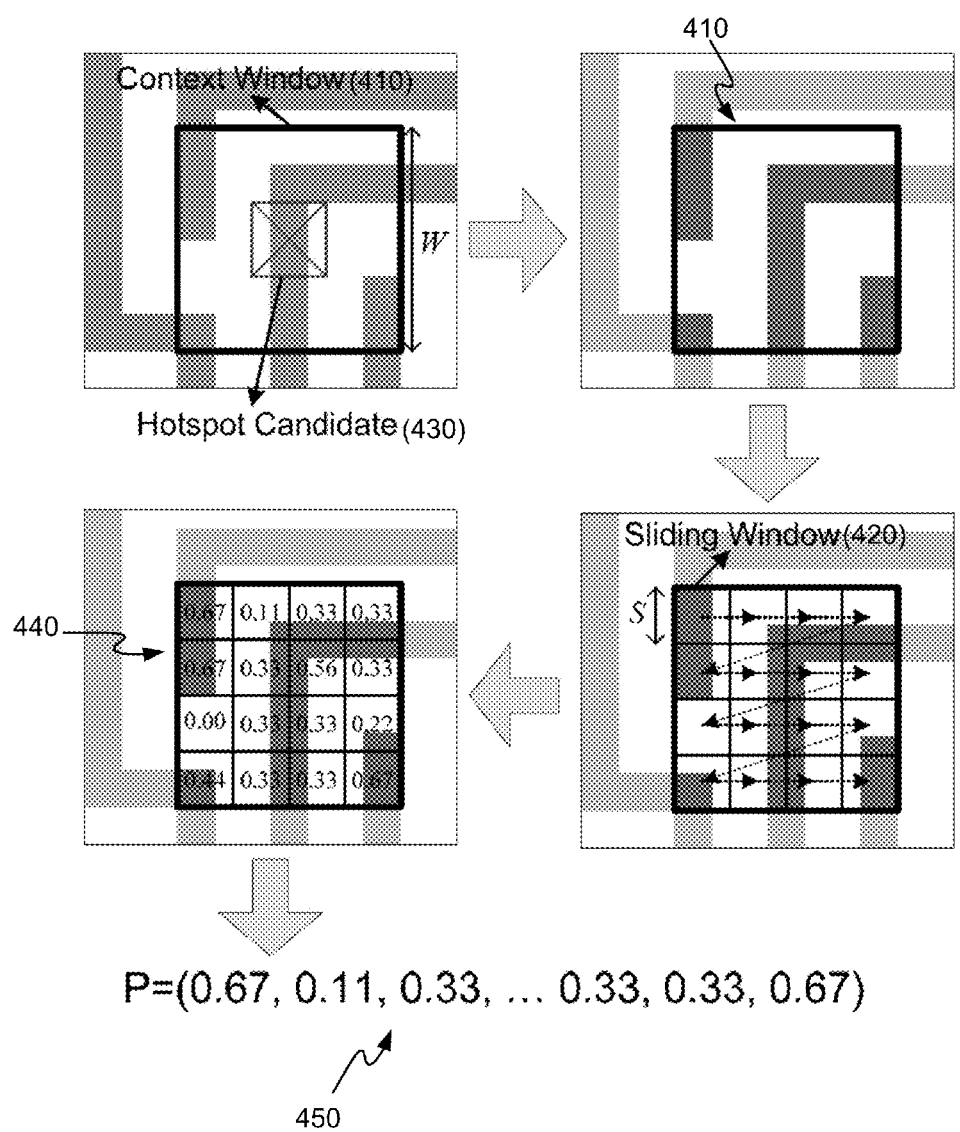
FIG. 4 illustrates a density-based feature encoding scheme.

FIG. 4 illustrates a density-based feature encoding scheme employed for a support vector machine algorithm. Support vector machine algorithms require the training and testing samples to be represented by a one-dimensional vector. The density-based feature encoding scheme achieves this representation by using two different sizes of windows, a context window 410 and a sliding window 420. The context window is usually centered at the location of a hotspot (or non-hotspot) candidate 430 and defines context objects to be considered. It is sometimes referred to as a clipped area or "clip." The sliding window defines an area where a density value is calculated and is sometimes referred to as a pixel. After the sliding window scans through the context window for density computation, the pattern within the clipped area can be transformed to a density array 440, which can be expressed in a one-dimensional feature vector 450.

Intuitively, smaller pixel size results in better resolution of the feature vectors. However, the vector dimension grows rapidly with the pixel size reduction. This may significantly affect the runtime efficiency of the machine learning process. Besides, large feature vector dimensionality may also cause over-fitting, thereby affecting the classification accuracy. With some implementations of the invention, a pixel size equal to half of the minimum drawn feature size is used.

To solve the aliasing problem associated with sampling positions, some embodiments of the invention apply two feature encoding schemes that differ in the context window positions. For example, the context window for one encoding scheme may shift away from that for the other encoding scheme by a half of the pixel size both horizontally and vertically. The two feature encoding schemes may be used to construct two types of machine learning models, which are applied to test patterns separately. Classification results from the application of the two types of machine learning models are analyzed to determine hotspot information.

It should be appreciated that the two-scheme machine learning classification methods comprises methods using two or more encoding schemes.

Two-Level Machine Learning Classification

Aliasing caused by the limited size of sampling may be overcome by using a sampling size that is sufficiently large. This approach, however, may be impractical due to high computational complexity and long runtime. Two-level machine learning classification methods may balance the requirements of accuracy and efficiency. In a two-level machine learning classification flow, a level-one classifier is built to separate the majority of non-hotspots from hotspots using central pattern information, i.e., layout objects in the closet proximity to a target candidate location. Since these layout objects lying in the closest proximity have the strongest influence on the printed image of the target, patterns very similar to hotspot patterns should be flagged at this stage as potential hotspots.

A level-two classifier is built to examine the peripheral pattern information, i.e. layout objects that are not in close proximity to the target location but that still exert non-negligible effects on it. Only patterns resembling hotspot patterns in the closest proximity and also in the peripheral region will be classified as hotspots. The addition of the level-two classifier can eliminate the majority if not all of the false positives passed down by the level-one classifier and thus improve the accuracy of the whole classification output.

With various implementations of the invention, the level-two classifiers is built by using a context window for feature encoding that is larger in size than the context window used for constructing the level-one classifiers. Additionally or alternatively, the training patterns for the level-two classifiers are different from the original training patterns used for constructing the level-one classifiers. The training patterns may comprise hotspots in the original training patterns and false hotspots obtained by applying the level-one classifiers to non-hotspots in the original training patterns.

Model Calibration System

Figure 5B:
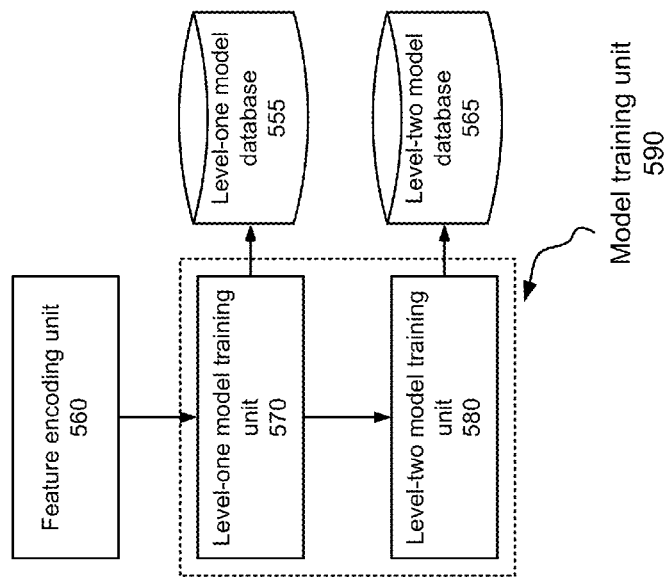
FIG. 5b illustrates an example of a model training unit for two-level machine learning in accordance with an embodiment of the present invention.
Figure 5A:
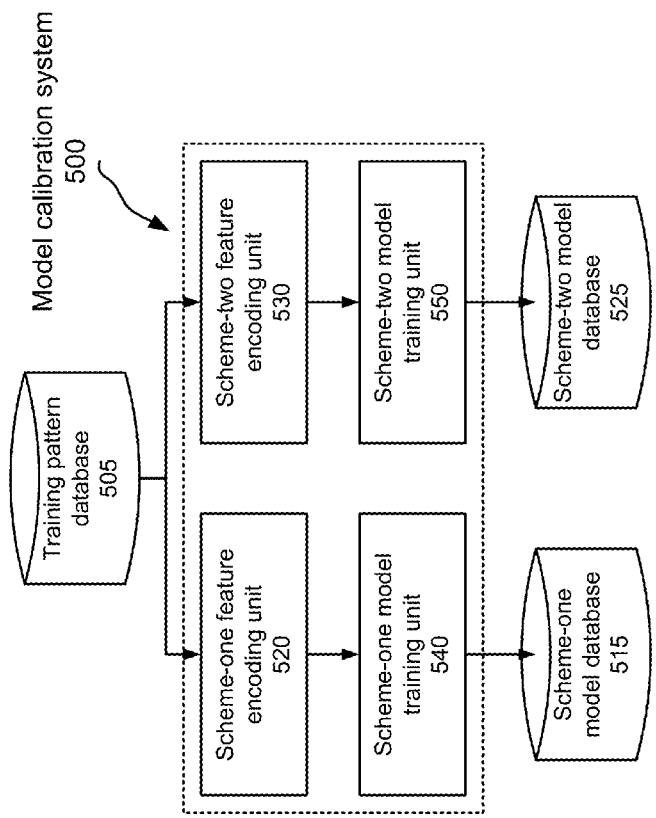
FIG. 5a illustrates an example of a model calibration system in accordance with an embodiment of the present invention.

FIG. 5*a* illustrates an example of a model calibration system 500 that may be provided according to various embodiments of the invention. As seen in this figure, the model calibration system 500 includes a scheme-one feature encoding unit 520, a scheme-two feature encoding unit 530, a scheme-one model training unit 540 and a scheme-two model training unit 550. As will be discussed in more detail below, some implementations of the model calibration system 500 may cooperate with (or incorporate) one or more of a training pattern database 505, a scheme-one model database 515, and a scheme-two model database 525.

FIG. 5*b* illustrates an example of a model training unit 590 that may be provided according to various embodiments of the invention. The model training unit 590 can be used to implement the scheme-one model training unit 540 and the scheme-two model training unit 550. As seen in this figure, the model training unit 590 includes a level-one model training unit 570 and a level-two model training unit 580. As will be discussed in more detail below, some implementations of the model training unit 590 may cooperate with (or incorporated) one or more of a feature encoding unit 560, a level-one model database 555, and a level-two model database 565. The feature encoding unit 560 may be either the scheme-one feature encoding unit 520 or the scheme-two feature encoding unit 530.

According to some embodiments of the invention, one or more of the scheme-one feature encoding unit 520, the scheme-two feature encoding unit 530, the scheme-one model training unit 540 and the scheme-two model training unit 550 may be implemented by one or more computing systems, such as the computing system illustrated in FIG. 1 and FIG. 2, executing programmable instructions. Correspondingly, some other embodiments of the invention may be implemented by software-executable instructions, stored on a computer-readable medium, for instructing a computing system to perform functions of one or more of the scheme-one feature encoding unit 520, the scheme-two feature encoding unit 530, the scheme-one model training unit 540 and the scheme-two model training unit 550. The computer-readable medium may be, for example, a magnetic storage device, an optical storage device, a "punched" surface type device, or a solid state storage device. While the training pattern database 505, the scheme-one model database 515, and the scheme-two model database 525 are shown as separate units in FIG. 5*a*, a single computer-readable medium may be used to implement some or all of these databases.

For ease of understanding, model calibration methods that may be employed according to various embodiments of the invention will be described with reference to the model calibration system 500 illustrated in FIG. 5*a*. It should be appreciated, however, that alternate implementations of a model calibration system 500 may be used to perform model calibration methods according to various embodiments of the invention. Likewise, the model calibration system 500 may be employed to perform other model calibration methods according to various embodiments of the invention.

With various implementations of the invention, the scheme-one feature encoding unit 520 and the scheme-two feature encoding unit 530 are configured to encode training patterns with two different feature encoding schemes. The training patterns may be extracted from a layout design in which hotspot locations have been identified previously. The hotspot locations may be identified by a process simulation or any other means. The locations where the hotspots are not found may be designated as non-hotspot locations. The training patterns can be extracted from these hotspot and non-hotspot locations using various conventionally known pattern processing technique.

Support vector machine models are employed in some embodiments of the invention. The support vector machine models require the training and testing samples to be represented by one-dimensional (1D) vectors in the feature space. A transformation (or characterization) procedure may be applied to the two-dimensional (2D) layout patterns and to convert them into 1D vectors. One of the feature encoding methods that may be used is based on pattern densities as illustrated in FIG. 4. Each of the training patterns may be characterized by a grayscale bitmap (the density array 440), for example. The bitmap can then be converted to a 1D vector 450.

The scheme-one feature encoding unit 520 and the scheme-two feature encoding unit 530 may place the context window 410 at slightly different positions for each of the training patterns. For example, the context window used by the scheme-two feature encoding unit 530 may shift away from that used by the scheme-one feature encoding unit 520 by a half of the pixel size (or the size of the sliding window 420) both horizontally and vertically.

The scheme-one model training unit 540 and the scheme-two model training unit 550 may be implemented using various machine learning model training methods. At least one machine learning model can be obtained for each of the feature encoding schemes. With various implementations of the invention, a two-level machine learning classification method may be employed. Accordingly, each of the scheme-one model training unit 540 and the scheme-two model training unit 550 may be implemented according to the model training unit 590 illustrated in FIG. 5b.

The model training unit 590 comprises two subunits, the level-one model training unit 570 and the level-two model training unit 580. The level-one model training unit 570 is configured to build a level-one model for separating the majority of non-hotspots from hotspots using central pattern information, while the level-two model training unit 580 is configured to remove the majority if not all of the false positives passed down by the level-one model using central and peripheral pattern information. Accordingly, the size of the context window used for building the level-one model is smaller than that of the context window used for building the level-two model. Once constructed, the level-one model may be applied to the non-hotspot training patterns. Some of the non-hotspot training patterns will be classified as hotspots, called false hotspot training patterns. These false hotspot training patterns are combined with the hotspot training patterns to form a new training set for the level-two model training unit 580. As noted above, a larger context window is applied to the new training set. The obtained level-one and level-two models may be stored in the level-one model database 555 and the level-two model database 565, respectively.

Hotspot Detection System

Figure 6:
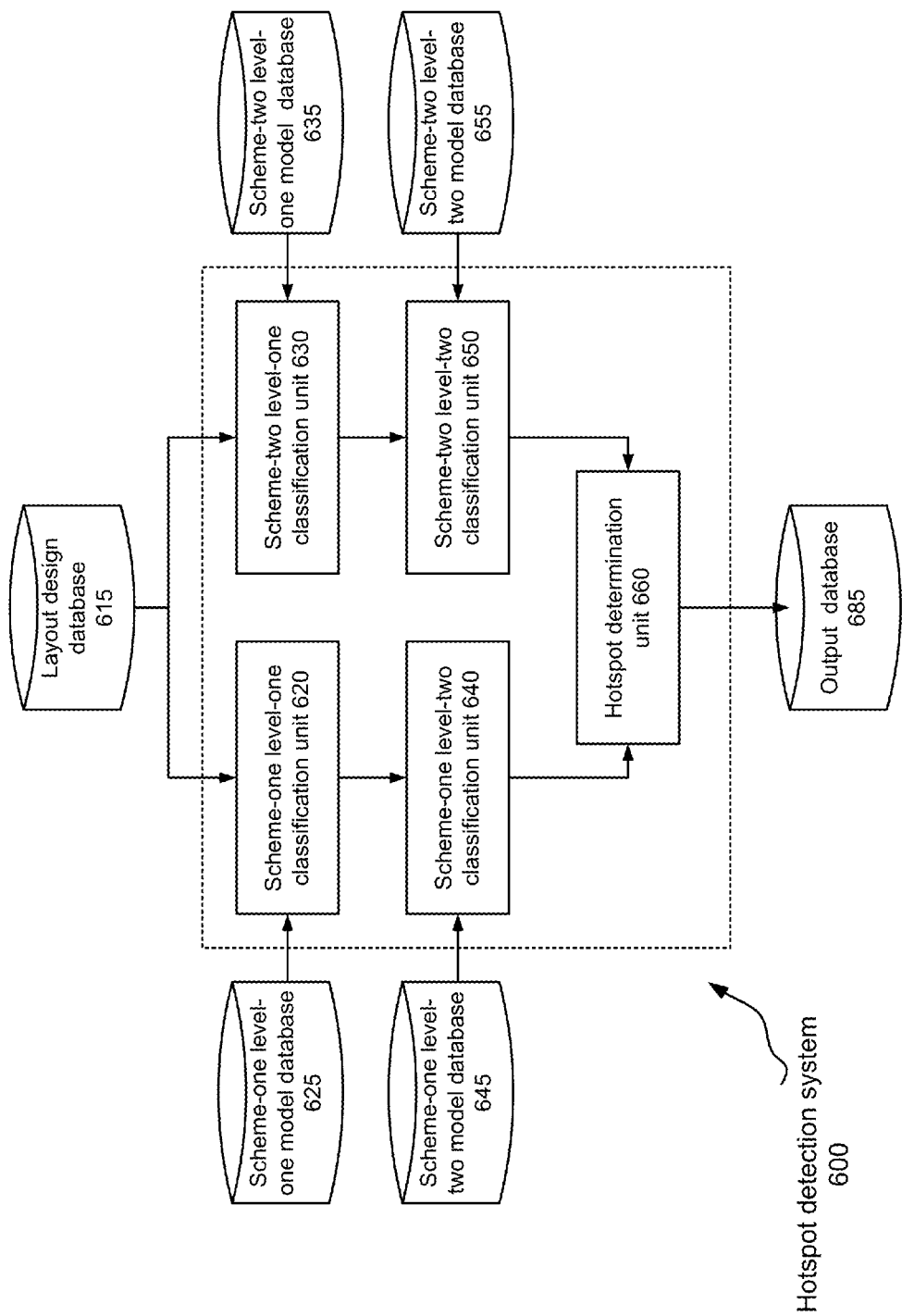
FIG. 6 illustrates an example of a hotspot detection system in accordance with an embodiment of the present invention.

FIG. 6 illustrates an example of a hotspot detection system 600 that may be provided according to various embodiments of the invention. As seen in this figure, the hotspot detection system 600 includes a scheme-one level-one classification unit 620, a scheme-two level-one classification unit 630, a scheme-one level-two classification unit 640, a scheme-two level-two classification unit 650, and a hotspot determination unit 660. As will be discussed in more detail below, some implementations of the hotspot detection system 600 may cooperate with (or incorporated) one or more of a layout design database 615, a scheme-one level-one model database 625, a scheme-two level-one model database 635, a scheme-one level-two model database 645, a scheme-two level-two model database 655 and an output database 685.

According to some embodiments of the invention, one or more of the scheme-one level-one classification unit 620, the scheme-two level-one classification unit 630, the scheme-one level-two classification unit 640, the scheme-two level-two classification unit 650, and the hotspot determination unit 660 may be implemented by one or more computing systems, such as the computing system illustrated in FIG. 1 and FIG. 2, executing programmable instructions. Correspondingly, some other embodiments of the invention may be implemented by software-executable instructions, stored on a computer-readable medium, for instructing a computing system to perform functions of one or more of the scheme-one level-one classification unit 620, the scheme-two level-one classification unit 630, the scheme-one level-two classification unit 640, the scheme-two level-two classification unit 650, and the hotspot determination unit 660. The computer-readable medium may be, for example, a magnetic storage device, an optical storage device, a "punched" surface type device, or a solid state storage device. While the layout design database 615, the scheme-one level-one model database 625, the scheme-two level-one model database 635, the scheme-one level-two model database 645, the scheme-two level-two model database 655 and the output database 685 are shown as separate units in FIG. 6, a single computer-readable medium may be used to implement some or all of these databases.

For ease of understanding, hotspot detection methods that may be employed according to various embodiments of the invention will be described with reference to the hybrid hotspot detection system 600 illustrated in FIG. 6. It should be appreciated, however, that alternate implementations of a hotspot detection system 600 may be used to perform the hotspot detection methods according to various embodiments of the invention. Likewise, the hotspot detection system 600 may be employed to perform other hybrid hotspot detection methods or in other configurations may be used to perform methods according to various embodiments of the invention different from those described below. For example, the hotspot detection system 600 may use one-level rather than two-level machine learning classification methods.

With various implementations of the invention, the scheme-one level-one classification unit 620 is configured to classify layout patterns (or test patterns) using a scheme-one level-one machine learning model. The scheme-one level-one machine learning model may be received from the scheme-one level-one model database 625, which is derived by the model calibration system 500 as described above. The layout patterns may be extracted from a layout design that needs to be checked or verified for hotspots. According to some embodiments of the invention, to extract layout patterns, anchors may be inserted based on discontinuities of the layout features and layout patterns may be extracted from areas near/surround the anchors. The areas where the discontinuities occur are usually susceptible to printability problems. Similar to the model calibration, an encoding procedure such as the one based on pattern densities may be applied to characterize the layout patterns for machine learning classification.

A global density pre-computation technique may be employed for encoding. This technique places a global grid on the entire layout design that needs to be checked. The pixel size is chosen to be the same as the size of the sliding window used for model calibration. The density of each pixel is computed and stored in a database. This simplifies the feature encoding process as the global density database needs to be built only once per design.

The scheme-one level-one classification unit 620 classifies the test patterns into potential non-hotspots and potential hotspots using a scheme-one level-one model. The scheme-one level-two classification unit 640 then identifies false positives (non-hotspots but being labeled as potential hotspots) and hotspots in the potential hotspots using a scheme-one level-two model. The identified false positives and the potential non-hotspots are combined and labeled as non-hotspots. The classification results are called as the scheme-one hotspot information, which is then provided to the hotspot determination unit 660 for further processing. A similar procedure is executed by the scheme-two level-one classification unit 630 and the scheme-two level-two classification unit 650.

The hotspot determination unit 660 is configured to determine hotspot information based on the scheme-one hotspot information and the scheme-two hotspot information. According to some embodiments of the invention, a test pattern that is identified as a hotspot by either the scheme-one models or the scheme-two models will be labeled as a hotspot by the hotspot determination unit 660. The final hotspot information may be stored in the output database 685 or displayed on a tangible medium such as a monitor.

CONCLUSION

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the invention. Rather, the scope of the invention is defined by the following claims and their equivalents. It should also be appreciated that the described machine learning methods and systems can be applied to applications other than hotspot detection. We therefore claim as our invention all that comes within the scope and spirit of these claims.

What is claimed is:

1. A method of machine learning-based hotspot detection, executed by at least one processor of a computer, comprising:
   receiving data of layout patterns of a layout design;
   determining, by using the at least one processor of a computer, scheme-one hotspot information by classifying the layout patterns based on one or more scheme-one machine learning models;
   determining scheme-two hotspot information by classifying the layout patterns based on one or more scheme-two machine learning models, the one or more scheme-two machine learning models and the one or more scheme-one machine learning models both employing a same density-based encoding method and a same set of training patterns, but being constructed differently by placing, while encoding each training pattern in the set of training patterns, a context window in different positions around the each training pattern;
   determining final hotspot information based on the scheme-one hotspot information and the scheme-two hotspot information; and
   storing the final hotspot information in a tangible processor-accessible medium, or displaying the final hotspot information on a tangible medium.

2. The method recited in claim 1, wherein the context windows used by the one or more scheme-two machine learning models and the one or more scheme-one machine learning models differ in their horizontal positions by a half of a horizontal dimension of a sliding window and in their vertical locations by a half of a vertical dimension of the sliding window.

3. The method recited in claim 1, wherein the one or more scheme-one machine learning models and the one or more scheme-two machine learning models are support vector machine models.

4. The method recited in claim 1, wherein each of the one or more scheme-one machine learning models and the one or more scheme-two machine learning models comprises a level-one model and a level-two model, wherein the level-one model is used to classify the layout patterns into potential non-hotspots and potential hotspots, the level-two model is used to identify false positives and hotspots in the potential hotspots.

5. The method recited in claim 1, wherein the one or more scheme-one machine learning models and the one or more scheme-two machine learning models both employ a two-level machine learning method, wherein the two-level machine learning method employs a level-one model and a level-two model, the level-one model being used to classify the layout patterns into potential non-hotspots and potential hotspots, the level-two model being used to identify false positives and hotspots in the potential hotspots.

6. The method recited in claim 1, wherein the data of layout patterns are derived from a global density database that is generated by using a global density pre-computation technique.

7. The method recited in claim 1, wherein the determining final hotspot information comprises: labeling layout patterns that are labeled as hotspots in either the scheme-one hotspot information or the scheme-two hotspot information.

8. A hotspot detection system, comprising:
   a scheme-one machine learning classification unit comprising one or more processors and being configured to generate scheme-one hotspot information by classifying layout patterns based one or more scheme-one machine learning models;
   a scheme-two machine learning classification unit configured to generate scheme-two hotspot information by classifying the layout patterns based one or more scheme-two machine learning models, the one or more scheme-two machine learning models and the one or more scheme-one machine learning models both employing a same density-based encoding method and a same set of training patterns, but being constructed differently by placing, while encoding each training pattern in the set of training patterns, a context window in different positions around the each training pattern; and
   a hotspot determination unit configured to determine final hotspot information based on the scheme-one hotspot information and the scheme-two hotspot information.

9. The hotspot detection system recited in claim 8, wherein the context windows used by the one or more scheme-two machine learning models and the one or more scheme-one machine learning models differ in their horizontal positions by a half of a horizontal dimension of a sliding window and in their vertical locations by a half of a vertical dimension of the sliding window.

10. The hotspot detection system recited in claim 8, wherein the scheme-one machine learning classification unit and the scheme-two machine learning classification unit both employ a two-level machine learning method, wherein the two-level machine learning method employs a level-one model and a level-two model, the level-one model being used to classify the layout patterns into potential non-hotspots and potential hotspots, the level-two model being used to identify false positives and hotspots in the potential hotspots.

11. A processor-readable device storing processor-executable instructions for causing one or more processors to perform a method of machine learning-based hotspot detection, the method comprising:

receiving data of layout patterns of a layout design;

determining scheme-one hotspot information by classifying the layout patterns based on one or more scheme-one machine learning models;

determining scheme-two hotspot information by classifying the layout patterns based on one or more scheme-two machine learning models, the one or more scheme-two machine learning models and the one or more scheme-one machine learning models both employing a same density-based encoding method and a same set of training patterns, but being constructed differently by placing, while encoding each training pattern in the set of training patterns, a context window in different positions around the each training pattern;

determining final hotspot information based on the scheme-one hotspot information and the scheme-two hotspot information; and storing the final hotspot information in a tangible processor-accessible medium, or displaying the final hotspot information on a tangible medium.

12. The processor-readable device recited in claim 11, wherein the context windows used by the one or more scheme-two machine learning models and the one or more scheme-one machine learning models differ in their horizontal positions by a half of a horizontal dimension of a sliding window and in their vertical locations by a half of a vertical dimension of the sliding window.

13. The processor-readable device recited in claim 11, wherein each of the one or more scheme-one machine learning models and the one or more scheme-two machine learning models comprises a level-one model and a level-two model, wherein the level-one model is used to classify the layout patterns into potential non-hotspots and potential hotspots, the level-two model is used to identify false positives and hotspots in the potential hotspots.

14. The processor-readable device recited in claim 11, wherein the one or more scheme-one machine learning models and the one or more scheme-two machine learning models both employ a two-level machine learning method, wherein the two-level machine learning method employs a level-one model and a level-two model, the level-one model being used to classify the layout patterns into potential non-hotspots and potential hotspots, the level-two model being used to identify false positives and hotspots in the potential hotspots.

\* \* \* \* \*